(12) United States Patent
Azami

(10) Patent No.: US 6,996,298 B2
(45) Date of Patent: Feb. 7, 2006

(54) ALL-FIBER BROADBAND POLARIZATION COMBINER

(75) Inventor: Nawfel Azami, Montreal (CA)

(73) Assignees: ITF Technologies Optiques INC, Montreal (CA); ITF Optical Technologies Inc., Montreal (CA)

( * ) Notice: Subject to any disclaimer, the term of this patent is extended or adjusted under 35 U.S.C. 154(b) by 212 days.

(21) Appl. No.: 10/694,280

(22) Filed: Oct. 27, 2003

(65) Prior Publication Data

US 2005/0089259 A1    Apr. 28, 2005

(51) Int. Cl.
*G02B 6/27* (2006.01)
(52) U.S. Cl. .............................. 385/11; 385/27; 385/50
(58) Field of Classification Search ................ 385/11, 385/15, 27, 28, 30, 31, 39, 42, 50; 359/483, 359/494, 495, 497
See application file for complete search history.

(56) References Cited

U.S. PATENT DOCUMENTS

| | | | |
|---|---|---|---|
| 5,479,546 A * | 12/1995 | Dumais et al. ................ | 385/43 |
| 5,920,666 A * | 7/1999 | Digonnet et al. ............. | 385/16 |
| 6,175,668 B1 * | 1/2001 | Borrelli et al. ................ | 385/11 |
| 6,522,796 B1 * | 2/2003 | Ziari et al. ..................... | 385/11 |
| 6,538,787 B1 * | 3/2003 | Moeller et al. ............. | 398/158 |
| 6,597,833 B1 * | 7/2003 | Pi et al. ......................... | 385/30 |
| 6,813,398 B1 * | 11/2004 | Taylor et al. .................. | 385/11 |
| 2003/0031415 A1 | 2/2003 | Gonthier et al. | |
| 2003/0063833 A1 | 4/2003 | Gonthier et al. | |
| 2003/0063834 A1 | 4/2003 | Godbout et al. | |

OTHER PUBLICATIONS

U.S. Appl. No. 10/397,672.

* cited by examiner

*Primary Examiner*—Rodney Bovernick
*Assistant Examiner*—Omar Rojas
(74) *Attorney, Agent, or Firm*—George J. Primak

(57) ABSTRACT

An all-fiber broadband polarization combiner is disclosed based on a Mach-Zehnder (MZ) structure. The entry coupler to the MZ is a polarization pump combiner (PPC) and the exit coupler is a wavelength division multiplexer (WDM) coupler. The two couplers are interconnected with two standard SM fibers which form the arms of the central zone of the MZ. Two polarization maintaining (PM) fibers are spliced to the two input arms of the PPC and are oriented so that polarization X in one PM fiber is orthogonal to polarization Y in the other PM fiber. And the MZ is induced with a phase shift $\Delta\phi$ of $\pi$ between the two arms of the central zone.

3 Claims, 3 Drawing Sheets

ALL-FIBER BROADBAND POLARIZATION COMBINER

FIELD OF THE INVENTION

This invention relates to an all-fiber polarization combiner for broadband applications. In particular, it relates to a Mach-Zehnder (MZ) structure in which the front coupler which is a polarization pump combiner (PPC) is made into a broadband combiner by controlling the phase between the two arms of the central zone of the MZ.

BACKGROUND OF THE INVENTION

In applicant's Canadian Patent Application No. 2,354,903 and corresponding U.S. patent application Ser. No. 10/039,571 published under No. US 2003/0031415 A1 and incorporated herein by reference, there is disclosed a polarization combining fused-fiber optical coupler which is operational in a broad wavelength bandwidth, i.e. as a broadband coupler. It is made of two polarization maintaining (PM) fibers spliced to two standard single mode (SM) fibers which extend and are fused and drawn to make a coupling zone. In this arrangement, the linearly polarized light is injected into the PM fibers and oriented so that the polarization in one of the PM fibers is orthogonal to that of the other PM fiber, and when this light passes through the input arms of the SM fibers (the axes of which are aligned with the birefringent axes of the PM fibers) and into the coupling zone, the two polarizations are combined in this zone and emerge from one output fiber of the coupler with only a minimal power transmission going to the second output fiber.

Furthermore, a polarization selective phase shifting, splitting and combining optical device based on a Mach-Zehnder structure is disclosed in applicant's Canadian Patent Application No. 2,357,991 and corresponding U.S. patent application Ser. No. 10/090,128 published under No. US 2003/0063834 A1. In this MZ structure, a relatively small phase shift is produced, typically of one $\pi$, by splicing in one of the arms of the central zone a segment of a PM fiber. A broadband polarization splitter or combiner may thus be achieved with a Mach-Zehnder structure where in the central zone, between the two couplers, a segment of a PM fiber is spliced in one of the arms to provide the required phase shifting. This is also described, for instance, in applicant's Canadian Patent Application No. 2,357,955 and corresponding U.S. patent application Ser. No. 10/045,190 published under No. US 2003/0063833 A1 with reference to FIG. 3 embodiment. This prior patent application also makes reference to broadband WDM fused fiber couplers.

Another all-fiber depolarizer with a polarization combiner based on a Mach-Zehnder interferometer structure is disclosed in applicant's Canadian Patent Application No. 2,393,172 and corresponding U.S. patent application Ser. No. 10/397,672 which also mentions a PPC used in order to scramble pump polarization. When it is desired to achieve a broadband operation with the PPC, inverted WICs (wavelength independent couplers) are utilized therewith.

SUMMARY OF THE INVENTION

It was surprisingly found that by providing a Mach-Zehnder structure where the entry coupler is a PPC and the exit coupler is a wavelength division multiplexer (WDM) and inducing the phase shift $\Delta\phi$ of $\pi$ between the two arms in the central zone between the two couplers, one obtains a broadband PPC when linearly polarized light is injected into the input arms of the PPC coupler from PM fibers spliced to said arms and oriented so that the polarization X of one PM fiber is orthogonal to the polarization Y of the other PM fiber. In this manner, the broadband effect is maintained throughout the system, leading to the combined polarizations X and Y exiting from one of the output arms of the WDM coupler and essentially no power transmission going to the second WDM output arm.

Thus, the all-fiber broadband polarization combiner of the present invention comprises two polarization maintaining (PM) fibers having input and output ends, and oriented so that polarization X in one of the PM fibers is orthogonal to polarization Y in the other PM fiber, said PM fibers being spliced by their output ends to the input arms of a polarization pump coupler (PPC) which is connected through a central zone to a WDM coupler which has the same spectral spacing as the PPC and is centered to the same wavelength, thereby forming a Mach-Zehnder (MZ) interferometer structure with the output arm of the WDM coupler forming the output arms of the MZ interferometer; the phase shift $\Delta\phi$ between the two arms of the central zone being set to a value of $\pi$, whereby the PPC is imparted with a broadband polarization effect and when broadband power is injected into PM fibers having polarizations X and Y respectively, it exits in combined form X and Y from one output arm of the MZ interferometer while the other MZ arm essentially has no power transmission going through it. This is due to the fact that the two wavelength responses from the two couplers are subtracted from one another.

Thus, by providing a broadband PPC in this manner, use of inverter WICs is eliminated and the splicing of a PM fiber section in one of the arms of the central zone is avoided, thus removing the necessity to align the coupler arms with the PM fibers at the entry and reducing losses due to the splicing of the PM fiber section in the arm of the central zone. Consequently, considerable advantages are produced by this simple and efficient MZ polarization combining structure.

BRIEF DESCRIPTION OF THE DRAWINGS

A preferred embodiment of the present invention will now be described with reference to the appended drawings, in which.

DETAILED DESCRIPTION OF THE INVENTION

The invention will now be described by way of a preferred, non-limitative embodiment, with reference to the appended drawings.

Figure 1:
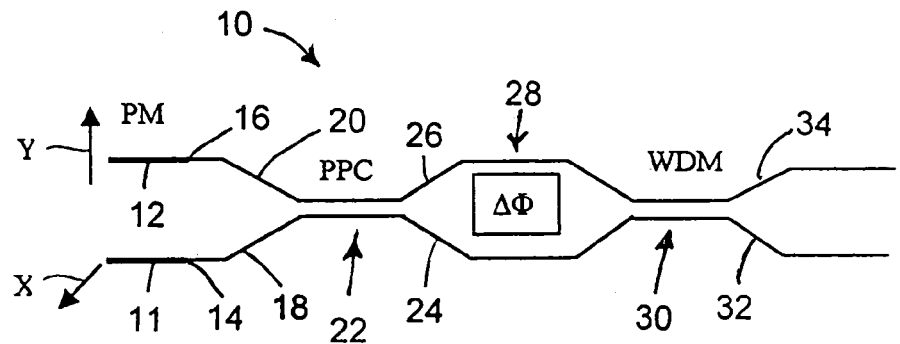
FIG. 1 is a schematic representation of the all-fiber broadband polarization combiner of the present invention.

FIG. 1 schematically illustrates the novel all-fiber broadband polarization combiner 10 in which two PM fibers 11 and 12 are spliced at points 14 and 16 to standard SM fibers 18, 20. The PM fibers 11, 12 may, for example, be PANDA™ fibers and the SM fibers are preferably SMF-28 fibers of Corning because they are particularly suitable for splicing with low losses. The PM fibers 11, 12 are so oriented that when light is injected into them from a light source (not shown), it is transmitted with polarizations X and Y being orthogonal to each other. The light source(s) is normally broadband, emitting signals with several wavelengths.

The SM fibers 18, 20 form the input arms of PPC 22 which is made by fusing and elongating these fibers in known manner. The output arms 24 and 26 extend through a central zone 28 and are again fused and elongated to form a WDM coupler 30 also in a known manner. The WDM coupler has the same spectral spacing as the PPC and is centered to the same wavelength. The output arms 32 and 34 of the WDM coupler also represent the output arms of the broadband polarization combiner 10.

The structure of the novel broadband polarization combiner 10 is that a Mach-Zehnder interferometer (MZ) and the broadband effect is achieved by setting the phase shift $\Delta\phi$ in the central zone 28 to $\pi$. It should be noted that the phase shift need not be precisely $\pi$ which in itself represents an indefinite number, but merely approximately $\pi$ to achieve the desired broadband operation. This phase shift may be imparted by different means, such as changing the refractive index of one of the fibers in the central zone 28 by UV radiation or subjecting one of the fibers to mechanical stress, or the like. It was surprisingly found that when the $\pi$ phase shift is induced into this MZ structure, the PPC 22 becomes a broadband PPC, thereby making the entire polarization combiner 10 a broadband device. As already previously indicated, the broadband polarization combiner makes it possible to obtain a wide wavelength bandwidth greater than 8 nm for an isolation at the outlet of 17 dB or greater.

Figure 2:
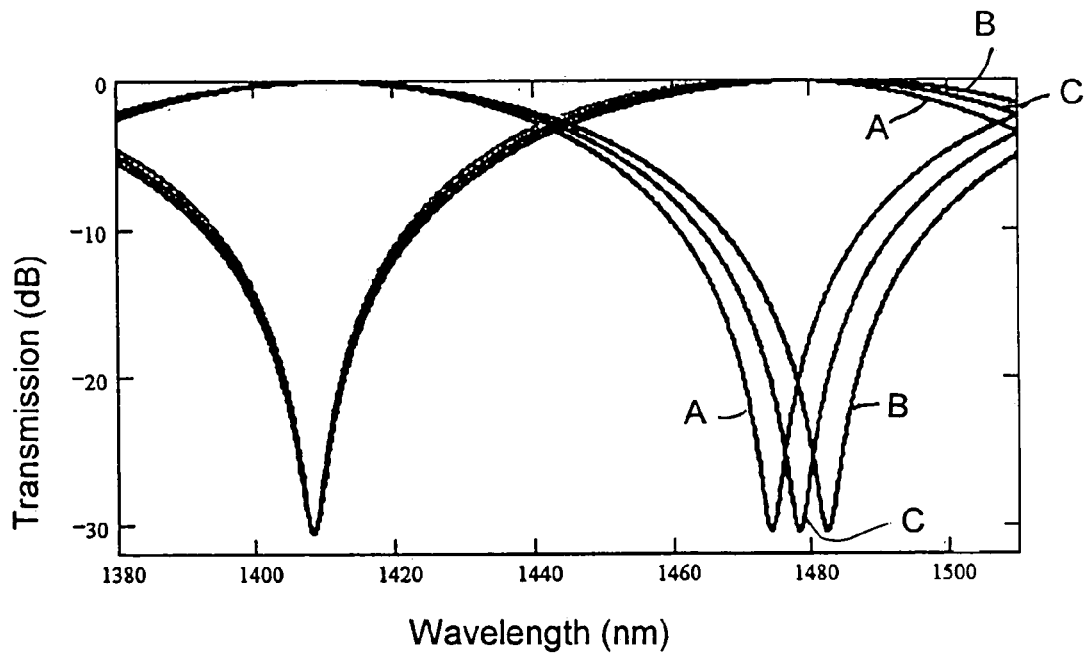
FIG. 2 is a graph showing curves of PPC transmission and WDM coupler transmission, where transmission power in dB is plotted with reference to the wavelength in nm.

FIG. 2 shows the transmission curves of PPC and WDM couplers respectively. Curve A is the transmission of polarization X and curve B of polarization Y. There were actually spacings of 68 nm and 75 nm for the two orthogonal polarizations. The transmission of the WDM coupler is represented by curve C for the two output ports. No broadband polarization combining is obtained.

Figure 3:
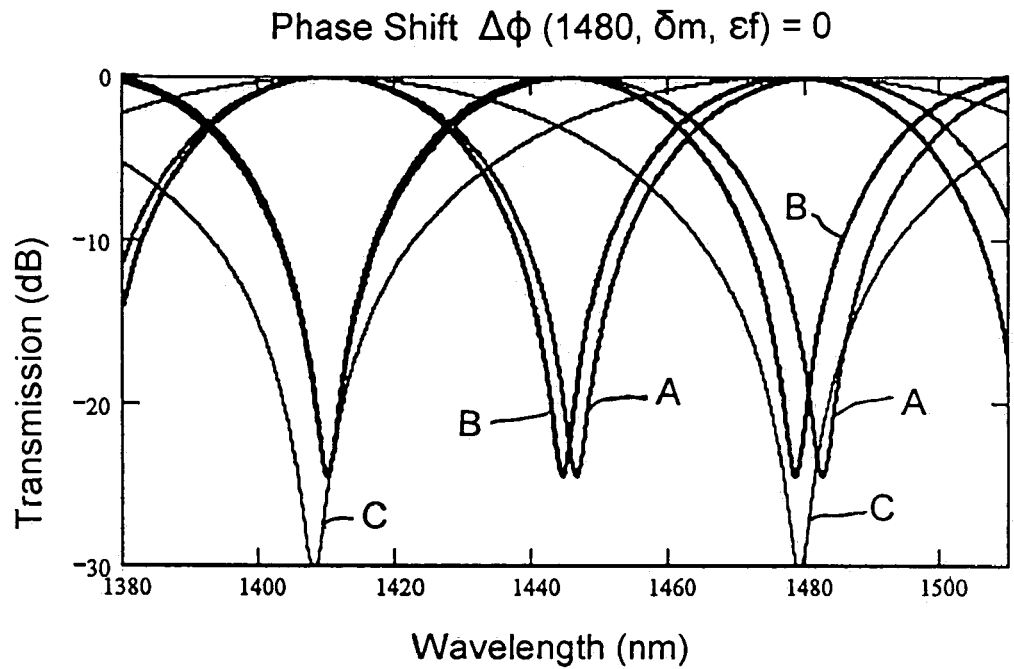
FIG. 3 is a graph showing curves of a spectral response of MZ structure of PPC and WDM coupler with a zero phase shift plotted in dB power with reference to the wavelength in nm.

FIG. 3 shows a graph of transmission achieved by the Mach-Zehnder structure shown in FIG. 1, but with zero phase shift. Again, curve A is the transmission of polarization Y, and curve C is the transmission of the WDM coupler. As is obvious from this graph, the responses of the couplers are added to one another in this case, and no broadband polarization combining is obtained.

Figure 4:
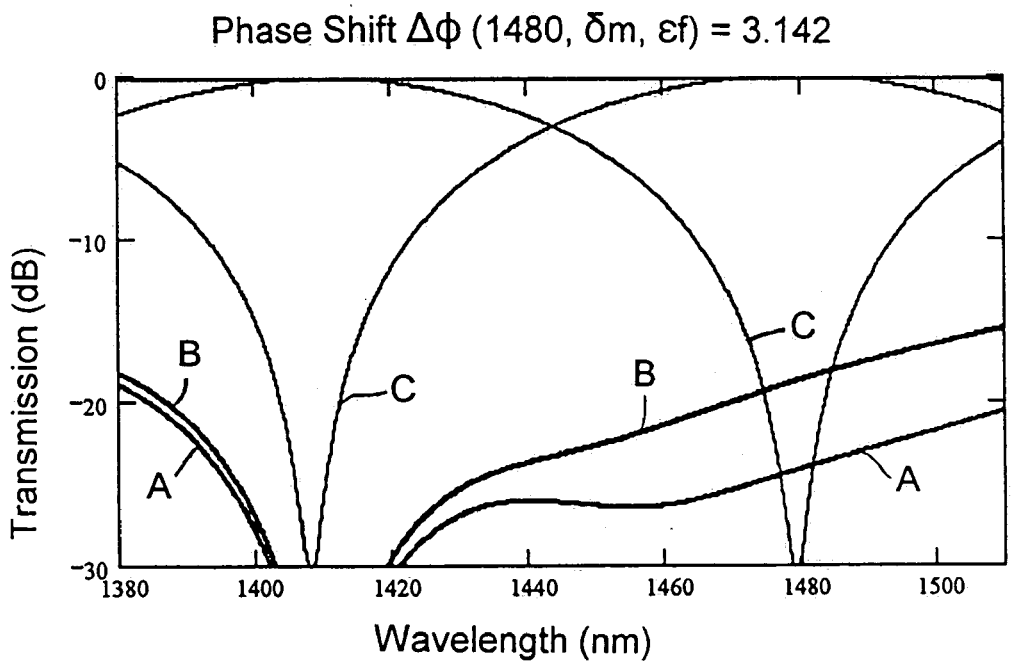
FIG. 4 is a graph showing curves of a spectral response of MZ structure of PPC and WDM coupler with a phase shift of $\pi$ plotted in dB power with reference to the wavelength in nm.

FIG. 4 shows a graph of a transmission achieved by the Mach-Zehnder structure shown in FIG. 1 where, in accordance with the present invention, the phase shift is $\pi$. Curve A is the transmission of polarization X, curve B is the transmission of polarization Y and curve C is the broadband transmission coming of the WDM coupler.

Figure 5:
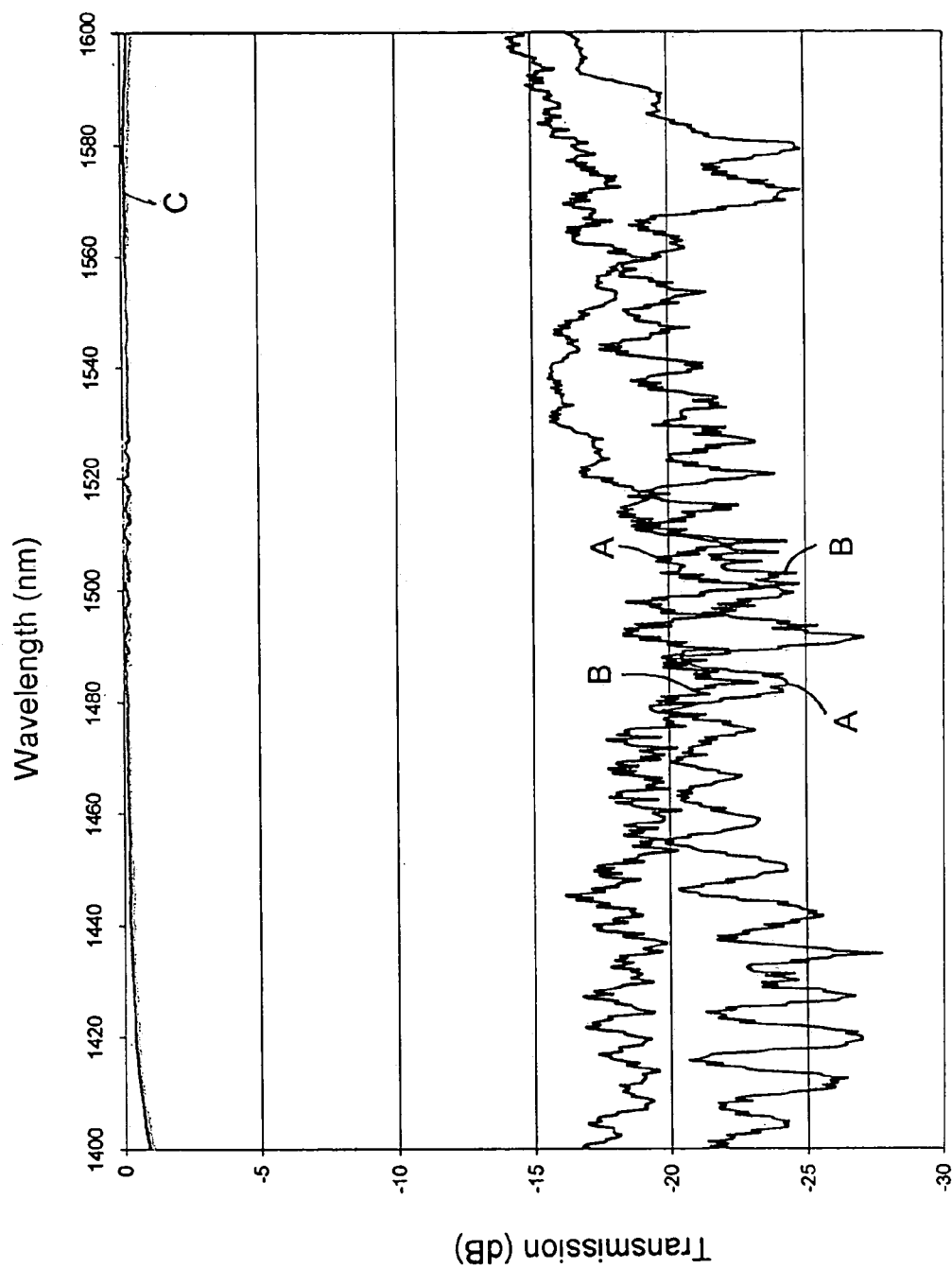
FIG. 5 is a graph showing the response at the exit of the broadband polarization combiner of the present invention.

Finally, FIG. 5 shows the power transmission coming out of the two output ports of the novel all fiber broadband polarization combiner. Here, it is seen that curves A and B representing polarizations X and Y respectively exit from one output port of the device in a broadband combination, while at the other output port, the power transmission C is almost zero.

The invention is not limited to the preferred embodiments described above and various modifications obvious to those skilled in the art can be made without departing from the scope of the following claims.

The invention claimed is:

1. An all-fiber broadband polarization combiner which has a Mach-Zehader (MZ) structure having an entry coupler and an exit coupler interconnected in a central zone with two standard single mode (SM) fibers which form two arms of in said central zone of the MZ, said entry coupler having two input wins also made of SM fibers to which are spliced polarization maintaining (PM) fibers oriented so that polarization X in one PM fiber is orthogonal to polarization Y in the other PM fiber, and said exit coupler having two output arms also made of SM fibers, which constitute the exit arms of the broadband polarization combiner, said entry coupler being a polarization pump combiner (PPC) and said exit coupler being a wavelength division multiplexer (WDM) coupler which has essentially the same spectral spacing and is centered to essentially the same wavelength as the PPC, and a phase shift $\Delta\phi$ of $\pi$ being induced between the two arms of the ventral zone.

2. A broadband polarization combiner according to claim 1, in which the phase shift $\Delta\phi$ of $\pi$ is induced between the two arms of the central zone of the MZ by subjecting one of the arms of the central zone to UV radiation.

3. A broadband polarization combiner according to claim 1, in which the phase shift $\Delta\phi$ of $\pi$ is induced between the two arms of the central zone of the MZ by subjecting one of the arms of the central zone to mechanical stress.

* * * * *

UNITED STATES PATENT AND TRADEMARK OFFICE
CERTIFICATE OF CORRECTION

PATENT NO. : 6,996,298 B2
DATED : February 7, 2006
INVENTOR(S) : Nawfel Azami

It is certified that error appears in the above-identified patent and that said Letters Patent is hereby corrected as shown below:

<u>Column 4,</u>
Line 25, "of" should be deleted.
Line 27, "wins" should be -- arms --, and "also" should be deleted.
Line 38, "ventral" should be -- central --.

Signed and Sealed this

Ninth Day of May, 2006

JON W. DUDAS
*Director of the United States Patent and Trademark Office*